(12) United States Patent
McKinzie et al.

(10) Patent No.: US 11,351,983 B2
(45) Date of Patent: Jun. 7, 2022

(54) POWER CONTROL SYSTEM WITH TRANSMISSION TRANSIENT BOOST FUNCTION

(71) Applicant: Deere & Company, Moline, IL (US)

(72) Inventors: Kyle K. McKinzie, Altamont, KS (US); Clayton G. Janasek, Independence, KS (US); Eric R. Anderson, Ames, IA (US)

(73) Assignee: DEERE & COMPANY, Moline, IL (US)

( * ) Notice: Subject to any disclaimer, the term of this patent is extended or adjusted under 35 U.S.C. 154(b) by 231 days.

(21) Appl. No.: 16/670,210

(22) Filed: Oct. 31, 2019

(65) Prior Publication Data
US 2021/0129829 A1    May 6, 2021

(51) Int. Cl.
*B60W 20/40* (2016.01)
*B60K 6/387* (2007.10)
(Continued)

(52) U.S. Cl.
CPC .............. *B60W 20/40* (2013.01); *B60K 6/00* (2013.01); *B60K 6/387* (2013.01); *B60K 6/442* (2013.01);
(Continued)

(58) Field of Classification Search
CPC .......... B60W 20/40; B60W 2710/027; B60W 2300/152; B60W 10/02; B60W 10/08;
(Continued)

(56) References Cited

U.S. PATENT DOCUMENTS

| 3,214,987 A | 11/1965 | Schenck et al. |
| 3,626,787 A | 12/1971 | Singer |

(Continued)

FOREIGN PATENT DOCUMENTS

| AT | 11545 U1 | 12/2010 |
| CN | 101255907 A | 9/2008 |

(Continued)

OTHER PUBLICATIONS

German Search Report for application No. 102019204706.8 dated Dec. 17, 2019.
(Continued)

*Primary Examiner* — David J Hlavka
(74) *Attorney, Agent, or Firm* — Klintworth & Rozenblat IP LLP

(57) ABSTRACT

A control system includes a transmission with a directional clutch and control assembly clutches coupled together and configured for selective engagement to transfer power. A controller is configured to selectively actuate the directional clutch and the control assembly clutches with clutch commands to implement a first split mode in which combined power is transferred to drive the output shaft, a first direct drive mode in which power from only the engine to drive the output shaft, and a first series mode in which power is transferred from primarily the at least one motor to drive the output shaft. The controller is further configured to implement a transient boost function within at least a portion of the first series mode in which the at least one directional clutch is partially engaged to supplement power from the at least one motor with power from the engine to drive the output shaft.

20 Claims, 6 Drawing Sheets

(51) Int. Cl.
  *B60K 6/00* (2006.01)
  *B60K 6/442* (2007.10)
  *B60K 6/54* (2007.10)
  *B62D 49/06* (2006.01)

(52) U.S. Cl.
  CPC .......... *B60K 6/54* (2013.01); *B60W 2710/027* (2013.01); *B62D 49/06* (2013.01)

(58) Field of Classification Search
  CPC ...... B60W 10/06; B60W 20/19; B60W 20/20; B60K 6/00; B60K 6/387; B60K 6/442; B60K 6/54; B60K 6/12; B60K 6/365; B60K 6/445; B60K 6/547; B60K 6/36; F16H 47/02; F16H 3/76; F16H 61/04; F16H 61/66; F16H 2200/20; F16H 2200/203
  See application file for complete search history.

(56) References Cited

U.S. PATENT DOCUMENTS

| | | | |
|---|---|---|---|
| 3,651,904 | A | 3/1972 | Snoy et al. |
| 3,714,845 | A | 2/1973 | Mooney, Jr. |
| 3,783,711 | A | 1/1974 | Orshansky, Jr. |
| 4,090,414 | A | 5/1978 | White |
| 4,164,155 | A | 8/1979 | Reed et al. |
| 4,164,156 | A | 8/1979 | Reed |
| 5,156,577 | A | 10/1992 | Fredriksen et al. |
| 5,353,662 | A | 10/1994 | Vaughters |
| 5,508,574 | A | 4/1996 | Vlock |
| 5,931,757 | A | 8/1999 | Schmidt |
| 6,394,925 | B1 | 5/2002 | Wontner et al. |
| 6,478,705 | B1 | 11/2002 | Holmes et al. |
| 6,684,148 | B2 | 1/2004 | Chess |
| 7,008,342 | B2 * | 3/2006 | Dyck .................... B60K 6/445 475/5 |
| 7,252,611 | B2 | 8/2007 | Raghavan et al. |
| 7,294,079 | B2 | 11/2007 | Raghavan et al. |
| 7,311,627 | B2 | 12/2007 | Tarasinski |
| 7,329,201 | B2 | 2/2008 | Raghavan et al. |
| 7,367,911 | B2 | 5/2008 | Raghavan et al. |
| 7,377,876 | B2 | 5/2008 | Yang |
| 7,399,246 | B2 | 7/2008 | Holmes et al. |
| 7,465,251 | B2 | 12/2008 | Zhang |
| 7,473,201 | B2 | 1/2009 | Raghavan |
| 7,479,081 | B2 | 1/2009 | Holmes |
| 7,491,144 | B2 | 2/2009 | Conlon |
| 7,901,314 | B2 | 3/2011 | Salvaire et al. |
| 7,942,776 | B2 | 5/2011 | Conlon |
| 8,234,956 | B2 | 8/2012 | Love et al. |
| 8,257,213 | B2 | 9/2012 | Komada et al. |
| 8,469,127 | B2 | 6/2013 | Tarasinski et al. |
| 8,500,585 | B2 | 8/2013 | Kim et al. |
| 8,573,340 | B2 | 11/2013 | Tarasinski et al. |
| 8,579,751 | B2 | 11/2013 | Phillips |
| 8,596,157 | B2 | 12/2013 | Vu |
| 8,660,724 | B2 | 2/2014 | Tarasinski et al. |
| 8,734,281 | B2 | 5/2014 | Ai et al. |
| 8,747,266 | B2 | 6/2014 | Aitzetmueller |
| 8,784,246 | B2 | 7/2014 | Treichel |
| 8,790,202 | B2 | 7/2014 | Sakai et al. |
| 8,944,194 | B2 | 2/2015 | Glaser et al. |
| 8,986,162 | B2 | 3/2015 | Dix et al. |
| 9,002,560 | B2 | 4/2015 | Hasegawa |
| 9,097,342 | B2 | 8/2015 | Dix et al. |
| 9,206,885 | B2 | 12/2015 | Rekow |
| 9,487,073 | B2 | 11/2016 | Love |
| 9,562,592 | B2 | 2/2017 | Rekow et al. |
| 9,840,165 | B2 | 12/2017 | Cox |
| 9,944,163 | B2 | 4/2018 | McKinzie |
| 9,981,665 | B2 | 5/2018 | Rekow et al. |
| 10,119,598 | B2 | 11/2018 | Rekow et al. |
| 2003/0186769 | A1 | 10/2003 | Ai et al. |
| 2004/0094381 | A1 | 5/2004 | Versteyhe |
| 2005/0036894 | A1 | 2/2005 | Oguri |
| 2005/0049100 | A1 | 3/2005 | Ai et al. |
| 2006/0046886 | A1 | 3/2006 | Holmes et al. |
| 2006/0111212 | A9 | 5/2006 | Ai et al. |
| 2006/0142104 | A1 | 6/2006 | Saller |
| 2006/0276291 | A1 | 12/2006 | Fabry et al. |
| 2007/0021256 | A1 | 1/2007 | Klemen et al. |
| 2007/0021257 | A1 | 1/2007 | Klemen et al. |
| 2007/0249455 | A1 | 10/2007 | Hasegawa et al. |
| 2008/0171626 | A1 | 7/2008 | Pollman |
| 2010/0048338 | A1 | 2/2010 | Si |
| 2010/0179009 | A1 | 7/2010 | Wittkopp et al. |
| 2010/0261565 | A1 | 10/2010 | Ai et al. |
| 2011/0130235 | A1 | 6/2011 | Phillips |
| 2012/0157254 | A1 | 6/2012 | Aitzetmueller |
| 2013/0023370 | A1 | 1/2013 | Grad |
| 2013/0123055 | A1 | 5/2013 | Mattsson et al. |
| 2013/0211655 | A1 | 8/2013 | Ogata et al. |
| 2014/0018201 | A1 | 1/2014 | Tolksdorf |
| 2014/0128196 | A1 | 5/2014 | Rintoo |
| 2014/0248986 | A1 | 9/2014 | Weeramantry et al. |
| 2014/0315685 | A1 | 10/2014 | Hofler |
| 2015/0006007 | A1 | 1/2015 | Kitahata |
| 2015/0072823 | A1 | 3/2015 | Rintoo |
| 2015/0142232 | A1 | 5/2015 | Tabata et al. |
| 2015/0183436 | A1 | 7/2015 | Rekow et al. |
| 2015/0184726 | A1 | 7/2015 | Rekow et al. |
| 2015/0292608 | A1 | 10/2015 | McKinzie |
| 2016/0090091 | A1 | 3/2016 | Gugel et al. |
| 2016/0201295 | A1 | 7/2016 | Kishimoto et al. |
| 2016/0272059 | A1 | 9/2016 | Watanabe et al. |
| 2017/0102059 | A1 | 4/2017 | Rekow et al. |
| 2017/0203646 | A1 | 7/2017 | Mueller et al. |
| 2017/0284508 | A1 | 10/2017 | Devreese |
| 2017/0284517 | A1 | 10/2017 | Rekow et al. |
| 2017/0328453 | A1 | 11/2017 | McKinzie et al. |
| 2018/0043764 | A1 | 2/2018 | McKinzie et al. |
| 2018/0149247 | A1 | 5/2018 | Rekow et al. |
| 2018/0298993 | A1 | 10/2018 | Fliearman et al. |

FOREIGN PATENT DOCUMENTS

| | | |
|---|---|---|
| CN | 102844588 A | 12/2012 |
| DE | 1173348 B | 7/1964 |
| DE | 4010919 A1 | 10/1991 |
| DE | 4131572 A1 | 3/1993 |
| DE | 19621200 A1 | 11/1997 |
| DE | 19954636 A1 | 5/2001 |
| DE | 10128076 A1 | 12/2002 |
| DE | 10319252 A1 | 11/2004 |
| DE | 112006002537 T5 | 9/2008 |
| DE | 102008032320 A1 | 1/2010 |
| DE | 202009007972 U1 | 6/2010 |
| DE | 102010026460 A1 | 3/2011 |
| DE | 102010021846 A1 | 12/2011 |
| DE | 10201102210 A1 | 7/2012 |
| DE | 102011102184 A1 | 7/2012 |
| DE | 10201105868 A1 | 1/2013 |
| DE | 102012216781 A1 | 3/2013 |
| DE | 102011115002 A1 | 4/2013 |
| DE | 102013220167 A1 | 4/2015 |
| DE | 202015102282 U1 | 6/2015 |
| DE | 19214225298 A1 | 7/2015 |
| DE | 102015215461 A1 | 2/2016 |
| DE | 102015220635 A1 | 5/2016 |
| DE | 201500200973 A1 | 7/2016 |
| DE | 102015205932 A1 | 10/2016 |
| DE | 102016120965 A1 | 5/2017 |
| DE | 102016204727 A1 | 9/2017 |
| DE | 102006041160 A1 | 9/2018 |
| DE | 102018108510 A1 | 10/2018 |
| DE | 102019205211 A1 | 11/2018 |
| DE | 102018209940 A1 | 12/2018 |
| DE | 102018212712 A1 | 1/2019 |
| DE | 102019204706 A1 | 11/2019 |
| DE | 102018213871 A1 | 2/2020 |
| DE | 102020209003 A1 | 3/2021 |
| DE | 102020211888 A1 | 5/2021 |
| DE | 102020215219 A1 | 6/2021 |

(56) References Cited

FOREIGN PATENT DOCUMENTS

| | | |
|---|---|---|
| EP | 805059 A2 | 5/1997 |
| EP | 1099882 A2 | 5/2001 |
| EP | 1707416 B1 | 8/2007 |
| EP | 02466168 | 6/2012 |
| EP | 02466169 | 6/2012 |
| EP | 2682531 A1 | 8/2014 |
| EP | 2832567 A1 | 4/2015 |
| EP | 2855226 B1 | 9/2018 |
| JP | 6462174 B1 | 1/2019 |
| WO | 2007017975 A1 | 2/2007 |
| WO | 2008019799 A2 | 2/2008 |
| WO | 2011092643 A1 | 8/2011 |
| WO | 2012171812 | 12/2012 |
| WO | 2017107848 A1 | 6/2017 |

OTHER PUBLICATIONS

USPTO, Non-Final Office Action issued in U.S. Appl. No. 16/555,913 dated Jan. 4, 2021.
German Search Report for German application No. 102020202651.3 dated Sep. 1, 2020.
German Search Report issued in counterpart application No. 102020213675.0 dated Mar. 17, 2021 (10 pages).
USPTO, Non-Final Office Action issued in U.S. Appl. No. 17/066,746 dated Oct. 26, 2021.
Extended European Search Report issued in counterpart application No. 20205965.5 dated Jul. 28, 2021. (10 pages).
USPTO, Final Office Action issued in U.S. Appl. No. 16/555,913 dated Apr. 20, 2021.
German Search Report issued in counterpart application No. 102017220666.7 dated May 28, 2021 (10 pages).
Deere & Company, U.S. Appl. No. 15/971,867, filed May 4, 2018.
DEERE & Company, U.S. Appl. No. 16/371,598, filed Apr. 1, 2019.
German Search Report for application No. 10215206174 dated Jul. 16, 2015.
German Search Report for application No. 1020182036705 dated Dec. 20, 2018.
German Search Report for application No. 102018210616 dated Feb. 1, 2019.
German Search Report for application No. 1020182099391 dated Feb. 27, 2019.
German Search Report for application No. 1020182099405 dated Feb. 28, 2019.
German Search Report for application No. 102018212712 dated Apr. 12, 2019.
CNIPA Office Action for Application No. 201510165982.4 dated Aug. 9, 2018, Serial Notice No. 2018080601675890.
USPTO, Office Action in U.S. Appl. No. 14/536,097 dated Sep. 25, 2017.
USPTO, Office Action in U.S. Appl. No. 15/664,289 dated Jul. 26, 2018.
USPTO, Office Action in U.S. Appl. No. 14/249,258 dated Apr. 21, 2017.
USPTO, Office Action in U.S. Appl. No. 15/664,289 dated Dec. 13, 2018.
USPTO, Office Action in U.S. Appl. No. 14/249,258 dated Oct. 17, 2016.
USPTO, Office Action in U.S. Appl. No. 14/249,258 dated Aug. 22, 2017.
USPTO, Office Action in U.S. Appl. No. 15/485,911 dated Feb. 8, 2019.
USPTO, Office Action in U.S. Appl. No. 15/793,522 dated Apr. 18, 2019.
USPTO, Office Action in U.S. Appl. No. 15/879,796 dated Aug. 23, 2019.
Schmetz, Roland, Electromechanische Traktorgetriebe Getriebe mit Zukunft, Electromechanical Tractor Units—Gearboxes with a Future, Landtechnik, Agricultural Engineering, vol. 54; Issue 2; pp. 72-73, Feb. 1999.
John M. Miller, Hybrid Electric Vehicle Propulsion System Architectures of the e-CVT Type, IEEE Transactions on Power Electronics, vol. 21, No. 3, May 2006.
Jian Dong, Zuomin Dong, Curran Crawford, Review of Continuously Variable Transmission Powertrain System for Hybrid Electric Vehicles, Proceedings of the ASME 2011 International Mechanical Engineering Congress & Exposition, IMECE2011-63321, Nov. 11-17, 2011.
Luscious Garage Hybrid Specialists, Gen 1 Prius Transmission Repair, P3009, P3120, P3125, https://lusciousgarage.com/blog/gen_1_prius_transmission_repair_p3009_p3120_p3125/ dated Oct. 28, 2008.
Deere & Company, U.S. Appl. No. 15/879,796, filed Jan. 25, 2018.
Deere & Company, U.S. Appl. No. 15/977,242, filed May 11, 2018.
German Search Report for application No. 102019205211 dated Sep. 5, 2019.
USPTO, Office Action in U.S. Appl. No. 15/628,979 dated Nov. 5, 2019.
USPTO Final Office Action issued in U.S. Appl. No. 15/971,867 dated Jun. 24, 2020.
German Search Report issued in counterpart application No. 102020209003.3 dated Jul. 17, 2021 (10 pages).
USPTO, Non-Final Office Action issued in pending U.S. Appl. No. 15/971,867 dated Dec. 12, 2019.
Deere & Company, U.S. Appl. No. 16/555,913, filed Aug. 29, 2019.
USPTO, Office Action in U.S. Appl. No. 16/371,598 dated Jul. 21, 2020.
German Search Report issued in application No. DE102021209495.3 with translation, dated Jan. 11, 2022 (24 pages).

\* cited by examiner

POWER CONTROL SYSTEM WITH TRANSMISSION TRANSIENT BOOST FUNCTION

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure generally relates a control system for a work vehicle, and more specifically to a power control system for a transmission of the work vehicle.

BACKGROUND OF THE DISCLOSURE

In a common mode of operation, referred to as a shuttle shift, the direction of movement of the work vehicle is changed, often under load. A common example is a tractor loader that moves in one direction to pick or scoop up a load, then lifts the load and reverses direction, often involving a turning movement, and unloads the load. This sequence is then reversed, and is often repeated many times. As the transmission slows to implement the shuttle shift, the transmission implements a series mode in which power is primarily generated with a motor rather than the engine.

SUMMARY OF THE DISCLOSURE

The disclosure provides a power control system for a transmission of a work vehicle.

In one aspect, the disclosure provides a control system for operating a power train of a work vehicle having an engine and at least one motor configured to generate power for an output shaft. The control system includes a transmission positioned operatively between the engine, the at least one motor, and the output shaft. The transmission includes at least one directional clutch and a plurality of control assembly clutches coupled together and configured for selective engagement to transfer the power from the engine and the at least one motor to drive the output shaft according to a plurality of modes. The control system includes a controller, having a processor and memory architecture, configured to selectively actuate the at least one directional clutch and the plurality of control assembly clutches with clutch commands to implement the plurality of modes, including a first split mode in which the at least one directional clutch is fully engaged and at least one of the plurality of the control assembly clutches is fully engaged to transfer combined power from the engine and the at least one motor to drive the output shaft, a first direct drive mode in which the at least one directional clutch is fully engaged and at least one of the plurality of the control assembly clutches is fully engaged to transfer power from only the engine to drive the output shaft, and a first series mode in which at least one of the plurality of the control assembly clutches is fully engaged to transfer power from primarily the at least one motor to drive the output shaft. The controller is further configured to implement a transient boost function within at least a portion of the first series mode in which the at least one directional clutch is partially engaged to supplement power from the at least one motor with power from the engine to drive the output shaft.

In another aspect, a work vehicle is provided and includes an engine; at least one continuously variable power source (CVP); an output shaft; a transmission positioned operatively between the engine, the at least one motor, and the output shaft. The transmission includes at least one directional clutch and a plurality of control assembly clutches coupled together and configured for selective engagement to transfer the power from the engine and the at least one motor to drive the output shaft according to a plurality of modes. The work vehicle further includes a controller, having a processor and memory architecture, configured to selectively actuate the at least one directional clutch and the plurality of control assembly clutches with clutch commands to implement the plurality of modes, including a first split mode in which the at least one directional clutch is fully engaged and at least one of the plurality of the control assembly clutches is fully engaged to transfer combined power from the engine and the at least one motor to drive the output shaft, a first direct drive mode in which the at least one directional clutch is fully engaged and at least one of the plurality of the control assembly clutches is fully engaged to transfer power from only the engine to drive the output shaft, and a first series mode in which at least one of the plurality of the control assembly clutches is fully engaged to transfer power from primarily the at least one motor to drive the output shaft. The controller is further configured to implement a transient boost function within at least a portion of the first series mode in which the at least one directional clutch is partially engaged to supplement power from the at least one motor with power from the engine to drive the output shaft.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
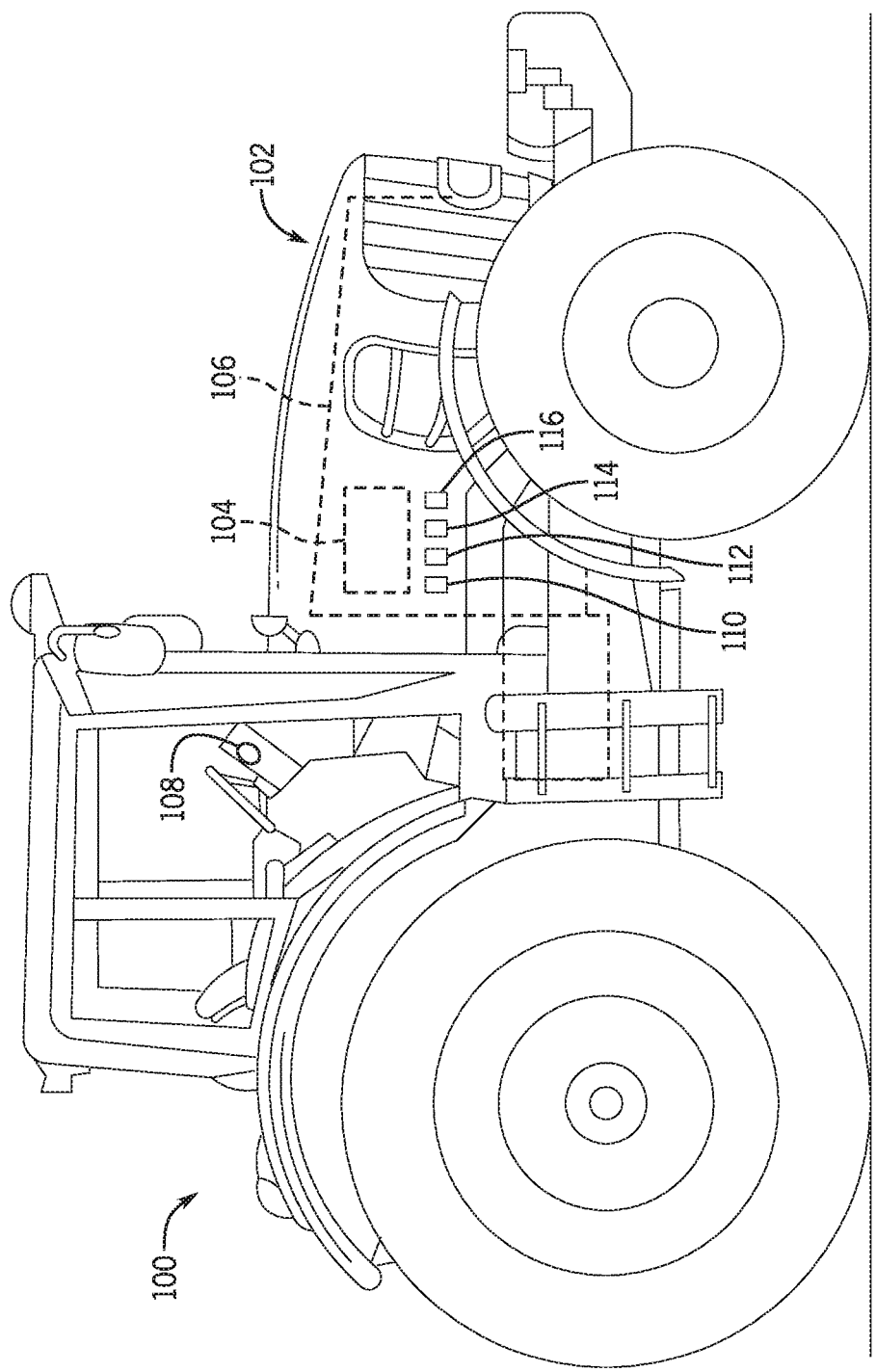
FIG. 1 is a side view of an example work vehicle that uses a power control system in accordance with an example embodiment of this disclosure.

The following describes one or more example embodiments of the disclosed power train (or vehicle), as shown in the accompanying figures of the drawings described briefly above. Various modifications to the example embodiments may be contemplated by one of skill in the art.

For convenience of notation, "component" may be used herein, particularly in the context of a planetary gear set, to indicate an element for transmission of power, such as a sun gear, a ring gear, or a planet gear carrier. Further, references to a "continuously" variable transmission, power train, or power source will be understood to also encompass, in various embodiments, configurations including an "infinitely" variable transmission, power train, or power source.

In the discussion below, various example configurations of shafts, gears, and other power transmission elements are described. It will be understood that various alternative configurations may be possible, within the spirit of this disclosure. For example, various configurations may utilize multiple shafts in place of a single shaft (or a single shaft in place of multiple shafts), may interpose one or more idler gears between various shafts or gears for the transmission of rotational power, and so on.

As used herein, "direct" or "directly" may be used to indicate power transmission between two system elements without an intervening conversion of the power to another form. For example, power may be considered as "directly" transmitted by an engine to an output component if the power is transferred via a number of shafts, clutches, and gears (e.g., various spur, bevel, summing or other gears) without being converted to a different form by a CVP (e.g., without being converted to electrical or hydraulic power by an electrical generator or a hydraulic pump). In certain configurations, fluidic transfer of rotational power by a torque converter may also be considered "direct."

In contrast, power may not be considered as "directly" transmitted between two system elements if some portion of the power is converted to another form during transmission. For example, power may not be considered as "directly" transmitted between an engine and an output component if a portion of the engine's power is converted to a different form by a CVP, even if that portion is later reconverted to rotational power (e.g., by another CVP) and then recombined with the unconverted engine power (e.g., by a summing planetary gear or other summing assembly).

Also, as used herein, "between" may be used with reference to a particular sequence or order of power transmission elements, rather than with regard to physical orientation or placement of the elements. For example, a clutch device may be considered as being "between" an engine and an output component if power is routed to the output component via the clutch device, whether or not the engine and the output component are on physically opposite sides of the clutch device.

A power control system is implemented on a vehicle having a power train with an engine and one or more additional power sources, such as one or more motors, that individually and collectively provide power to drive the vehicle and perform work functions. For example, the power control system may implement one or more split modes in which power from the engine and motor are combined in the transmission to provide output torque, one or more direct drive modes in which power from only the engine provides the output torque, and one or more series modes in which power from primarily the motor provides the output torque.

The power control system includes a transmission with a number of clutches to implement the various modes. Generally, the clutches, upon actuation, are fully engaged to implement the modes. However, as described herein, the power control system may implement a transient boost function during the series mode in which one or more clutches are partially engaged such that power from the engine may be used to supplement the power from the motors. By using the power control system of the present disclosure, the transient boost function provides more consistent power, typically without requiring a larger motor to otherwise provide the commanded power, thereby improving packaging and cost.

As used herein, the term "transient" boost function refers to a temporary or momentary application of engine torque through a transmission during a series mode in which power is otherwise only generated by a motor or other continuous power source. Despite the transient boost function, the series mode is still considered a series mode since the application of engine torque is only temporary and a substantial portion of the torque during the series mode (e.g., more than 50% of the mode time) is only a result of the motor torque. Moreover, the supplemental torque from the transient boost function is a result of only partial engagement of an appropriate clutch, in contrast to split modes in which the respective clutch is fully engaged. Additional details will be provided below.

Referring to FIG. 1, a work vehicle 100 includes a power control system 102 implemented with a controller 104 to control components of a power train 106 of the vehicle 100. Generally, the power train 106 includes one or more engines, motors, batteries, and power transfer elements to power the vehicle 100 in forward and reverse directions, as well as to provide mechanical or electrical power to various additional systems of the vehicle 100. As described in greater detail below, the power control system 102 is used to implement a transient boost function to provide a smoother power transition to and from a series mode, such as during a shuttle shift.

In FIG. 1, the vehicle 100 is depicted as a tractor. It will be understood, however, that other configurations may be possible, including configurations with vehicle 100 as a different kind of tractor, a harvester, a log skidder, a grader, or one of various other work vehicle types. It will further be understood that the disclosed power train 106 may also be used in non-work vehicles and non-vehicle applications (e.g., fixed-location power installations).

Generally, the controller 104 implements operation of the power control system 102, power train 106, and other aspects of the vehicle 100, including any of the functions described herein. The controller 104 may be configured as computing devices with associated processor devices and memory architectures, as hydraulic, electrical or electro-hydraulic controllers, or otherwise. As such, the controller 104 may be configured to execute various computational and control functionality with respect to the vehicle 100. The controller 104 may be in electronic, hydraulic, or other communication with various other systems or devices of the vehicle 100, including via a CAN bus (not shown). For example, the controller 104 may be in electronic or hydraulic communication with various actuators, sensors, and other devices within (or outside of) the vehicle 100, some of which are discussed in greater detail below.

In some embodiments, the controller 104 may be configured to receive input commands and to interface with an operator via a human-machine interface or operator interface, including typical steering, acceleration, velocity, and wheel braking controls, as well as other suitable controls. In one embodiment, such operator interfaces may include a lever or other transmission selection device 108 that facilitates operator interaction with the power transfer elements of the power train 106, particularly those that initiate a shuttle shift, e.g., transitioning between forward and reverse travel directions, and/or the transient boost function described below.

As noted above, the vehicle 100 may include one or more sensors in communication to provide various types of feedback and data with the controller 104 in order to implement the functions described herein, such as the transmission modes and/or the transient boost functions. Such sensors may include a vehicle speed sensor 110 that collects information associated with the speed of the vehicle 100; one or more directional clutch sensors 112, 113 that collect information associated with the positions of one or more transmission clutch elements; a CVP sensor 114 that collects torque and/or speed information associated with the variable power sources described below; and/or an output torque sensor 116 that collects information associated with the output of a transmission of the power control system 102. One or more of the sensors 110, 112, 113, 114, 116 may be omitted.

Figure 2:
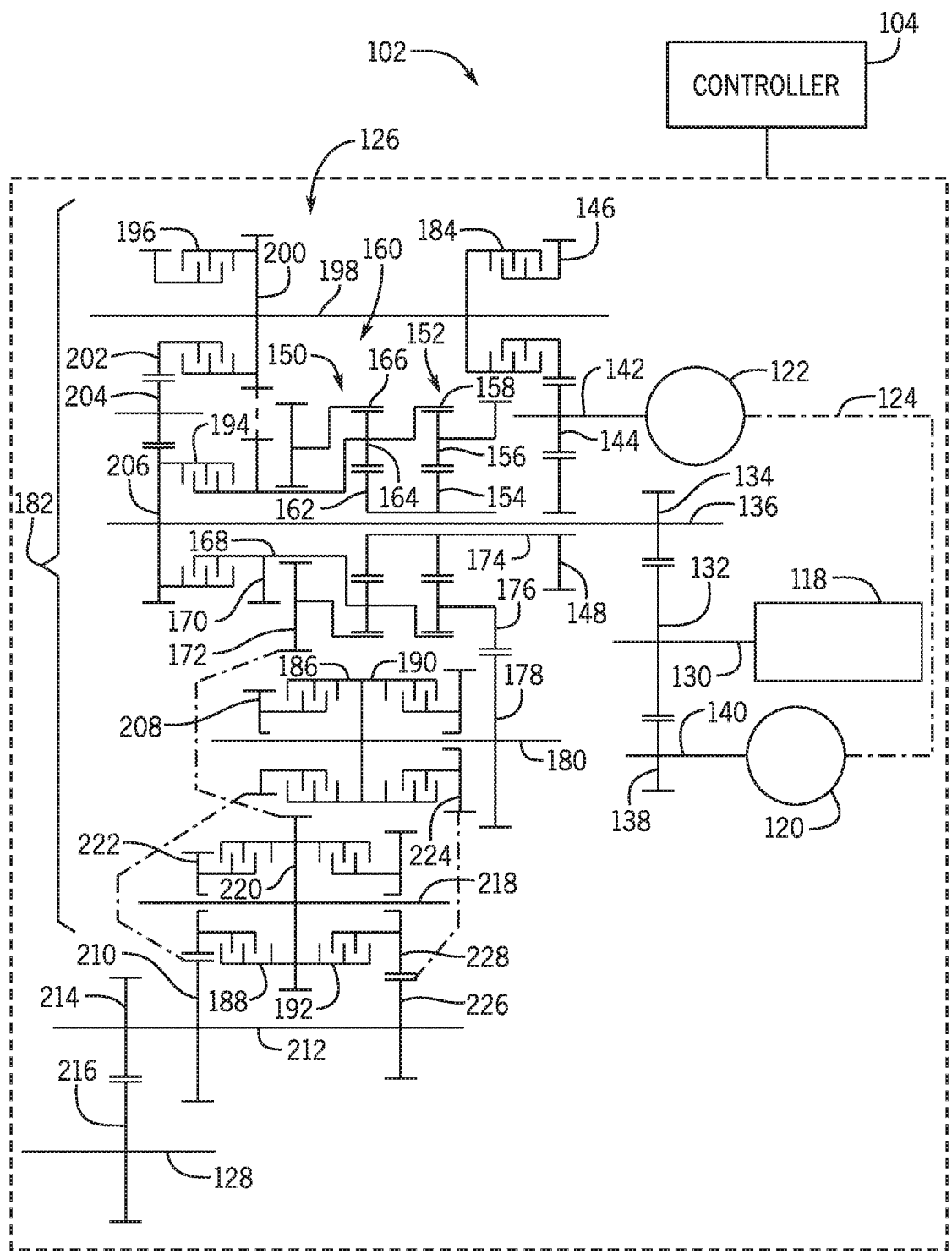
FIG. 2 is a power train for implementing the power control system of the example work vehicle of FIG. 1 in accordance with an example embodiment.

Referring now to FIG. 2, an example power train 106 is depicted as implementing aspects of the power control system 102. As shown and discussed in greater detail below, the power control system 102 may be considered to include power train 106 and the controller 104, which is in communication with the various components of the power train 106 and additionally receives information from transmission selection device 108 and sensors 110, 112, 113, 114, 116 (FIG. 1). Characteristics of power train 106, including example alternatives to the depicted power train 106, may be disclosed in United States Publication No. US 2018/0043764 which is commonly owned by the assignee of the present application and incorporated herein by reference.

The power train 106 may include an engine 118, which may be an internal combustion engine of various known configurations. The power train 106 may also include a first continuously variable power source (CVP) 120 (e.g., an electrical or hydraulic motor) and a second CVP 122 (e.g., an electrical or hydraulic motor), which may be connected together by a conduit 124 (e.g., an electrical or hydraulic conduit). The power train 106 includes a transmission 126 that transfers power from the engine 118, first CVP 120, and/or second CVP 122 to an output shaft 128. As described below, the transmission 126 includes a number of gearing, clutch, and control assemblies to suitably drive the output shaft 128 at different speeds in multiple directions. Generally, in one example, the transmission 126 of power train 106 for implementing the power control system 102 may be any type of infinitely variable transmission arrangement. As noted above, the CVP sensor 114 (FIG. 1) may be provided to collect speed and/or torque information associated with the second CVP 122, and the output torque sensor 116 (FIG. 1) may be provided to collect torque information associated with the output shaft 128 of the transmission 126.

The engine 118 may provide rotational power via an engine output element, such as a flywheel, to an engine shaft 130 according to commands from the controller 104 based on the desired operation. The engine shaft 130 may be configured to provide rotational power to a gear 132. The gear 132 may be enmeshed with a gear 134, which may be supported on (e.g., fixed to) a shaft 136. The shaft 136 may be substantially parallel to and spaced apart from the engine shaft 130. The shaft 136 may support various components of the power train 106 as will be discussed in detail.

The gear 132 may also be enmeshed with a gear 138, which is supported on (e.g., fixed to) a shaft 140. The shaft 140 may be substantially parallel to and spaced apart from the engine shaft 130, and the shaft 140 may be connected to the first CVP 120. Accordingly, mechanical power from the engine (i.e., engine power) may transfer via the engine shaft 130, to the enmeshed gears 132, 138, to the shaft 140, and to the first CVP 120. The first CVP 120 may convert this power to an alternate form (e.g., electrical or hydraulic power) for transmission over the conduit 124 to the second CVP 122. This converted and transmitted power may then be re-converted by the second CVP 122 for mechanical output along a shaft 142. Various known control devices (not shown) may be provided to regulate such conversion, transmission, re-conversion, and so on. Also, in some embodiments, the shaft 142 may support a gear 144 (or other similar component). The gear 144 may be enmeshed with and may transfer power to a gear 146. The gear 144 may also be enmeshed with and may transfer power to a gear 148. Accordingly, power from the second CVP 122 (i.e., CVP power) may be divided between the gear 146 and the gear 148 for transmission to other components as will be discussed in more detail below.

The power train 106 may further include a variator 150 that represents one example of an arrangement that enables an infinitely variable power transmission between the engine 118 and CVPs 120, 122 and the output shaft 128. As discussed below, this arrangement further enables the power control system 102 in which mechanical energy from the engine 118 may be used to boost the CVP power in a series mode. Other arrangements of the variator 150, engine 118, and CVPs 120, 122 may be provided.

In some embodiments, the variator 150 may include at least two planetary gearsets. In some embodiments, the planetary gearset may be interconnected and supported on a common shaft, such as the shaft 136, and the planetary gearsets 152, 160 may be substantially concentric. In other embodiments, the different planetary gearsets 152,160 may be supported on separate, respective shafts that are nonconcentric. The arrangement of the planetary gearsets may be configured according to the available space within the vehicle 100 for packaging the power train 106.

As shown in the embodiment of FIG. 2, the variator 150 may include a first planetary gearset (i.e., a "low" planetary gearset) 152 with a first sun gear 154, first planet gears and associated carrier 156, and a first ring gear 158. Moreover, the variator 150 may include a second planetary gearset (i.e., a "high" planetary gearset) 160 with a second sun gear 162, second planet gears and associated carrier 164, and a second ring gear 166. The second planet gears and carrier 164 may be directly attached to the first ring gear 158. Also, the second planet gears and carrier 164 may be directly attached to a shaft 168 having a gear 170 fixed thereon. Moreover, the second ring gear 166 may be directly attached to a gear 172. As shown, the shaft 168, the gear 170, and the gear 172 may each receive and may be substantially concentric to the shaft 136. Although not specifically shown, it will be appreciated that the power train 106 may include various bearings for supporting these components concentrically. Specifically, the shaft 168 may be rotationally attached via a bearing to the shaft 136, and the gear 172 may be rotationally attached via another bearing on the shaft 168.

On the opposite side of the variator 150 (from left to right in FIG. 2), the gear 148 may be mounted (e.g., fixed) on a shaft 174, which also supports the first and second sun gears 154, 162. In some embodiments, the shaft 174 may be hollow and may receive the shaft 136. A bearing (not shown) may rotationally support the shaft 174 on the shaft 136 substantially concentrically.

Furthermore, the first planet gears and associated carrier 156 may be attached to a gear 176. The gear 176 may be enmeshed with a gear 178, which is fixed to a shaft 180. The shaft 180 may be substantially parallel to and spaced apart from the shaft 136.

As noted above, the power train 106 may be configured for delivering power (from the engine 118, the first CVP 120, and/or the second CVP 122) to the output shaft 128 or other output component via the transmission 126. The output shaft 128 may be configured to transmit this received power to wheels of the vehicle 100, to a power take-off (PTO) shaft, to a range box, to an implement, or other component of the vehicle 100.

The power train 106 may have a plurality of selectable modes, such as direct drive modes, split path modes, and series modes. In a direct drive mode, power from the engine 118 may be transmitted to the output shaft 128, and power from the second CVP 122 may be prevented from transferring to the output shaft 128. In a split path mode, power from the engine 118 and the second CVP 122 may be summed by the variator 150, and the summed or combined power may be delivered to the output shaft 128. Moreover, in a series mode, power from the second CVP 122 may be transmitted to the output shaft 128 and power from the engine 118 may be generally prevented from transferring to the output shaft 128. The power train 106 may also have different speed modes in one more of the direct drive, split path, and series modes, and these different speed modes may provide different angular speed ranges for the output shaft 128. The power train 106 may switch between the plurality of modes to maintain suitable operating efficiency. Furthermore, the power train 106 may have one or more forward modes for moving the vehicle 100 in a forward direction and one or more reverse modes for moving the vehicle 100 in a reverse direction.

The power train 106 may implement a transient boost function, as well as different modes and speeds, for example, using a control assembly 182. The control assembly 182 may include one or more selectable transmission components. The selectable transmission components may have first positions or states (engaged positions or states), in which the respective device transmits effectively all power from an input component to an output component. The selectable transmission components may also have a second position or states (disengaged positions or states), in which the device prevents power transmission from the input to the output component. The selectable transmission components may have third positions or states (partially engaged positions or states), in which the respective device transmits only a portion of the power from an input component to an output component. Unless otherwise noted, the term "engaged" refers to the first position or state in which effectively all of the power is transferred, whereas "partially engaged" specifically refers to only the partial transfer of power. The selectable transmission components of the control assembly 182 may include one or more wet clutches, dry clutches, dog collar clutches, brakes, synchronizers, or other similar devices. The control assembly 182 may also include an actuator for actuating the selectable transmission components between the first, second, and third positions.

As shown in FIG. 2, the control assembly 182 may include a first clutch 184, a second clutch 186, a third clutch 188, a fourth clutch 190, and a fifth clutch 192. Also, the control assembly 182 may include a forward directional clutch 194 and a reverse directional clutch 196. As noted above, one or more directional clutch sensors 112, 113 (FIG. 1) may be associated with the directional clutches 194, 196 to provide feedback and/or status information to the controller 104 for implementing the transient boost function, as discussed in greater detail below. In some examples, the sensors 112, 113 may be omitted.

In one example, the first clutch 184 may be mounted and supported on a shaft 198. Also, the first clutch 184, in an engaged position, may engage the gear 146 with the shaft 198 for rotation as a unit. The first clutch 184, in a disengaged position, may allow the gear 146 to rotate relative to the shaft 198. Also, a gear 200 may be fixed to the shaft 198, and the gear 200 may be enmeshed with the gear 170 that is fixed to the shaft 168. The reverse directional clutch 196 may be supported on the shaft 198 (i.e., commonly supported on the shaft 198 with the first clutch 184). The reverse directional clutch 196 may engage and, alternatively, disengage the gear 200 and a gear 202. The gear 202 may be enmeshed with an idler gear 204, and the idler gear 204 may be enmeshed with a gear 206. The forward directional clutch 194 may be supported on gear 206, which is in turn supported on the shaft 136, to selectively engage shaft 168. Thus, the forward directional clutch 194 may be concentric with both the shaft 168 and the shaft 136. The second clutch 186 may be supported on the shaft 180. The second clutch 186 may engage and, alternatively, disengage the shaft 180 and a gear 208. The gear 208 may be enmeshed with a gear 210. The gear 210 may be fixed to and mounted on a countershaft 212. The countershaft 212 may also support a gear 214. The gear 214 may be enmeshed with a gear 216, which is fixed to the output shaft 128.

The third clutch 188 may be supported on a shaft 218. The shaft 218 may be substantially parallel and spaced at a distance from the shaft 180. Also, a gear 220 may be fixed to and supported by the shaft 218. The gear 220 may be enmeshed with the gear 172 as shown. The third clutch 188 may engage and, alternatively, disengage the gear 220 and a gear 222. The gear 222 may be enmeshed with the gear 210. The fourth clutch 190 may be supported on the shaft 180 (in common with the second clutch 186). The fourth clutch 190 may engage and, alternatively, disengage the shaft 180 and a gear 224. The gear 224 may be enmeshed with a gear 226, which is mounted on and fixed to the countershaft 212. Additionally, the fifth clutch 192 may be supported on the shaft 218 (in common with and concentric with the third clutch 188). The fifth clutch 192 may engage and, alternatively, disengage the shaft 218 and a gear 228. The gear 228 may be enmeshed with the gear 226.

The different transmission modes of the power train 106 will now be discussed. Like the embodiments discussed above, the power train 106 may have at least one at least one split-path mode in which power from the engine 118 and one or more of the CVPs 120, 122 are combined. Also, in some embodiments, the power train 106 may additionally have a direct drive mode and/or and at least one generally CVP-only mode (i.e., series mode).

In some embodiments, engaging the first clutch 184 and the second clutch 186 may place the power train 106 in a first forward mode. Generally, this mode may be a CVP-only mode (i.e., series mode), subject to the transient boost function discussed below. In this mode, mechanical power from the engine 118 may flow via the shaft 130, the gear 132, the gear 138, and the shaft 140 to the first CVP 120. The first CVP 120 may convert this input mechanical power to electrical or hydraulic power and supply the converted power to the second CVP 122. Also, power from the engine 118 that flows via the shaft 130, the gear 132, and the gear 134 to the shaft 136 is nominally prevented from being input into the variator 150. Moreover, mechanical power from the second CVP 122 may rotate the shaft 142 and the attached gear 144. This CVP power may rotate the gear 148 for rotating the first sun gear 154. The CVP power may also rotate the gear 146, which may transfer across the first clutch 184 to the shaft 198, to the gear 200, to the gear 170, to the shaft 168, to the second planet gears and associated carrier 164, to the first ring gear 158. In other words, in this mode, power from the second CVP 122 may drivingly rotate two components of the variator 150 (the first sun gear 154 and the first ring gear 158), and the power may be summed and re-combined at the first planet gears and associated carrier 156. The re-combined power may transfer via the gear 176 and the gear 178 to the shaft 180. Power at the shaft 180 may be transferred across the second clutch 186 to the gear 208, to the gear 210, along the countershaft 212, to the gear 214, to the gear 216, and ultimately to the output shaft 128. In some embodiments, the series mode may provide the output shaft 128 with relatively high torque at low angular speed output. Thus, this mode may be referred to as a creeper mode in some embodiments. Furthermore, as will become evident, the first clutch 184 may be used only in this mode; therefore, the first clutch 184 may be referred to as a "creeper clutch". In other words, the second CVP 122 rotates the first sun gear 154 and the first ring gear 158, and the CVP power recombines at the first planet gears and carrier 156 as a result. As noted below, the transient boost function may be selectively implemented in this mode to boost power in certain situations, while operation without the transient boost function is referred to as nominal operation or function.

In some embodiments, engaging the forward directional clutch 194 and the second clutch 186 may place the power train 106 in a first forward directional mode. This mode may be a split-path mode in which the variator 150 sums power from the second CVP 122 and the engine 118 and outputs the combined power to the output shaft 128. Specifically, power from the second CVP 122 is transmitted from the shaft 142, to the gear 144, to the gear 148, to the shaft 174, to drive the first sun gear 154. Also, power from the engine 118 is transmitted to the shaft 130, to the gear 132, to the gear 134, to the shaft 136, to the gear 206, through the forward directional clutch 194, to the shaft 168, to the second planet gears and associated carrier 164 to the first ring gear 158. Combined power from the second CVP 122 and the engine 118 is summed at the first planet gears and the associated carrier 156 and is transmitted via the gear 176 and the gear 178 to the shaft 180. Power at the shaft 180 may be transferred across the second clutch 186 to the gear 208, to the gear 210, along the countershaft 212, to the gear 214, to the gear 216, and ultimately to the output shaft 128.

Additionally, in some embodiments, engaging the forward directional clutch 194 and the third clutch 188 may place the power train 106 in a second forward directional mode as a further split-path mode. Specifically, power from the second CVP 122 may be transmitted from the shaft 142, to the gear 144, to the gear 148, to the shaft 174, to drive the second sun gear 162. Also, power from the engine 118 is transmitted to the shaft 130, to the gear 132, to the gear 134, to the shaft 136, to the gear 206, through the forward directional clutch 194, to the shaft 168, to the second planet gears and associated carrier 164. Combined power from the second CVP 122 and the engine 118 may be summed at the second ring gear 166, and may be transmitted to the gear 172, to the gear 220, through the third clutch 188, to the gear 222, to the gear 210, to the countershaft 212, to the gear 214, to the gear 216, and ultimately to the output shaft 128.

In addition, in some embodiments, engaging the forward directional clutch 194 and the fourth clutch 190 may place the power train 106 in a third forward directional mode as a further split-path mode. Specifically, power from the second CVP 122 is transmitted from the shaft 142, to the gear 144, to the gear 148, to the shaft 174, to drive the first sun gear 154. Also, power from the engine 118 is transmitted to the shaft 130, to the gear 132, to the gear 134, to the shaft 136, to the gear 206, through the forward directional clutch 194, to the shaft 168, to the second planet gears and associated carrier 164, to the first ring gear 158. Combined power from the second CVP 122 and the engine 118 is summed at the first planet gears and the associated carrier 156 and is transmitted via the gear 176 and the gear 178 to the shaft 180. Power at the shaft 180 may be transferred across the fourth clutch 190 to the gear 210, to the gear 226, along the countershaft 212, to the gear 214, to the gear 216, and ultimately to the output shaft 128.

Moreover, in some embodiments, engaging the forward directional clutch 194 and the fifth clutch 192 may place the power train 106 in a fourth forward directional mode as a further split-path mode. Specifically, power from the second CVP 122 may be transmitted from the shaft 142, to the gear 144, to the gear 148, to the shaft 174, to drive the second sun gear 162. Also, power from the engine 118 is transmitted to the shaft 130, to the gear 132, to the gear 134, to the shaft 136, to the gear 206, through the forward directional clutch 194, to the shaft 168, to the second planet gears and associated carrier 164. Combined power from the second CVP 122 and the engine 118 may be summed at the second ring gear 166, and may be transmitted to the gear 172, to the gear 220, through the fifth clutch 192, to the gear 228, to the gear 226, to the countershaft 212, to the gear 214, to the gear 216, and ultimately to the output shaft 128.

The power train 106 may also have one or more reverse modes for driving the vehicle 100 in the opposite (reverse) direction from those modes discussed above. In some embodiments, the power train 106 may provide a reverse series mode, which corresponds to the forward series mode discussed above in which the first clutch 184 and the second clutch 186 may be engaged such that the second CVP 122 drives the shaft 142 and the other downstream components in the opposite direction from that described above to move the vehicle 100 in reverse. The transient boost function may also be implemented in the reverse series mode Moreover, the power train 106 may have a plurality of split-path reverse directional modes. In some embodiments, the power train 106 may provide reverse directional modes that correspond to the forward directional modes discussed above; however, the reverse directional clutch 196 may be engaged instead of the forward directional clutch 194 to achieve the reverse modes.

Accordingly, the power train 106 may provide a first reverse directional mode by engaging the reverse directional clutch 196 and the second clutch 186. As such, power from the second CVP 122 may be transmitted from the shaft 142, to the gear 144, to the gear 148, to the shaft 174, to drive the first sun gear 154. Also, power from the engine 118 may be transmitted to the shaft 130, to the gear 132, to the gear 134, to the shaft 136, to the gear 206, to the idler gear 204, to the gear 202, through the reverse directional clutch 196, to the gear 200 to the gear 170, to the shaft 168, to the second planet gears and associated carrier 164 to the first ring gear 158. Combined power from the second CVP 122 and the engine 118 may be summed at the first planet gears and the associated carrier 156 and may be transmitted via the gear 176 and the gear 178 to the shaft 180. Power at the shaft 180 may be transferred across the second clutch 186 to the gear 208, to the gear 210, along the countershaft 212, to the gear 214, to the gear 216, and ultimately to the output shaft 128.

The power train 106 may also provide a second reverse directional mode by engaging the reverse directional clutch 196 and the third clutch 188. As such, power from the second CVP 122 may be transmitted from the shaft 142, to the gear 144, to the gear 148, to the shaft 174, to drive the second sun gear 162. Also, power from the engine 118 may be transmitted to the shaft 130, to the gear 132, to the gear 134, to the shaft 136, to the gear 206, to the idler gear 204, to the gear 202, through the reverse directional clutch 196, to the gear 200, to the gear 170, to the shaft 168, to the second planet gears and associated carrier 164. Combined power from the second CVP 122 and the engine 118 may be summed at the second ring gear 166, and may be transmitted to the gear 172, to the gear 220, through the third clutch 188, to the gear 222, to the gear 210, to the countershaft 212, to the gear 214, to the gear 216, and ultimately to the output shaft 128.

In addition, in some embodiments, engaging the reverse directional clutch 196 and the fourth clutch 190 may place the power train 106 in a third reverse directional mode. Specifically, power from the second CVP 122 may be transmitted from the shaft 142, to the gear 144, to the gear 148, to the shaft 174, to drive the first sun gear 154. Also, power from the engine 118 may be transmitted to the shaft 130, to the gear 132, to the gear 134, to the shaft 136, to the gear 206, to the idler gear 204, to the gear 202, through the reverse directional clutch 196, to the gear 200, to the gear 170 to the shaft 168, to the second planet gears and associated carrier 164, to the first ring gear 158. Combined power from the second CVP 122 and the engine 118 may be summed at the first planet gears and the associated carrier 156 and may be transmitted via the gear 176 and the gear 178 to the shaft 180. Power at the shaft 180 may be transferred across the fourth clutch 190 to the gear 210, to the gear 226, along the countershaft 212, to the gear 214, to the gear 216, and ultimately to the output shaft 128.

Moreover, in some embodiments, engaging the reverse directional clutch 196 and the fifth clutch 192 may place the power train 106 in a fourth reverse directional mode. Specifically, power from the second CVP 122 may be transmitted from the shaft 142, to the gear 144, to the gear 148, to the shaft 174, to drive the second sun gear 162. Also, power from the engine 118 may be transmitted to the shaft 130, to the gear 132, to the gear 134, to the shaft 136, to the gear 206, to the idler gear 204, to the gear 202, through the reverse directional clutch 196, to the gear 200, to the gear 170, to the shaft 168, to the second planet gears and associated carrier 164. Combined power from the second CVP 122 and the engine 118 may be summed at the second ring gear 166, and may be transmitted to the gear 172, to the gear 220, through the fifth clutch 192, to the gear 228, to the gear 226, to the countershaft 212, to the gear 214, to the gear 216, and ultimately to the output shaft 128.

Furthermore, the power train 106 may provide one or more direct drive modes, in which power from the engine 118 is transferred to the output shaft 128 and power from the second CVP 122 is prevented from transferring to the output shaft 128. Specifically, engaging the second clutch 186, the third clutch 188, and the forward directional clutch 194 may provide a first forward direct drive mode. As such, power from the engine 118 may transfer from the shaft 130, to the gear 132, to the shaft 136, to the gear 206, through the forward directional clutch 194, to the second planet gears and carrier 164, and to the first ring gear 158. Moreover, with the second and third clutches 186, 188 engaged, the second ring gear 166 and the first planet gears and carrier 156 lock in a fixed ratio to the countershaft 212 and, thus, the output shaft 128. This effectively constrains the ratio of each side of the variator 150 and locks the engine speed directly to the ground speed of the vehicle 100 by a ratio determined by the tooth counts of the engaged gear train. In this scenario, the speed of the sun gears 154, 162 is fixed and the sun gears 154, 162 carry torque between the two sides of the variator 150. Furthermore, the first CVP 120 and the second CVP 122 may be unpowered.

Similarly, engaging the fourth clutch 190, the fifth clutch 192, and the forward directional clutch 194 may provide a second forward direct drive mode. Furthermore, engaging the second clutch 186, the third clutch 188, and the reverse directional clutch 196 may provide a first reverse direct drive mode. Also, engaging the fourth clutch 190, the fifth clutch 192, and the reverse directional clutch 196 may provide a second reverse direct drive mode.

As introduced above, the controller 104 is coupled to the control assembly 182 for controlling one or more actuators and, as a result, controlling movement of the one or more selective transmission components within the transmission 126, including the first clutch 184, the second clutch 186, the third clutch 188, the fourth clutch 190, the fifth clutch 192, the forward directional clutch 194 and the reverse directional clutch 196. Generally, the controller 104 operates the control assembly 182, as well as the engine 118 and CVPs 120, 122, to implement the desired function, e.g., to achieve the requested torque at the output shaft 128 for overall control of the vehicle 100. This includes vehicle accelerations, stops, starts, shifting between gear ratios, shifting between directions, and the like. As described below, the power control system 102 selectively operates during aspects of these functions in situations in which it is desirable to boost and/or smooth output torque As introduced above, the controller 104 may generate commands for implementing various aspects of the power control system 102 based on inputs from one or more operator input devices, including transmission selection device 108, and one or more sensors, including sensors 110, 112, 113, 114, 116. In particular, the controller 104 may command operation of the transmission 126 into the various modes and functions described above. Additionally, the controller 104 may selectively (or continuously) implement operation of the transmission 126 according to the transient boost function during the series mode such that torque from the engine 118 may temporarily supplement the torque of the second CVP 122. For example, during implementation of nominal operation or function (e.g., without the boost function), the forward directional clutch is fully engaged during the forward split mode and fully disengaged during the series mode and the reverse split mode; and the reverse directional clutch 196 is fully engaged during the reverse split mode and fully disengaged during the series mode and the forward split mode. However, during implementation of the transient boost function, the forward and/or reverse directional clutches 194, 196 are selectively partially engaged to transfer a portion of the torque from the engine 118 into the transmission during the series modes to supplement the torque from the second CVP 122, as will be described below.

Figure 3:
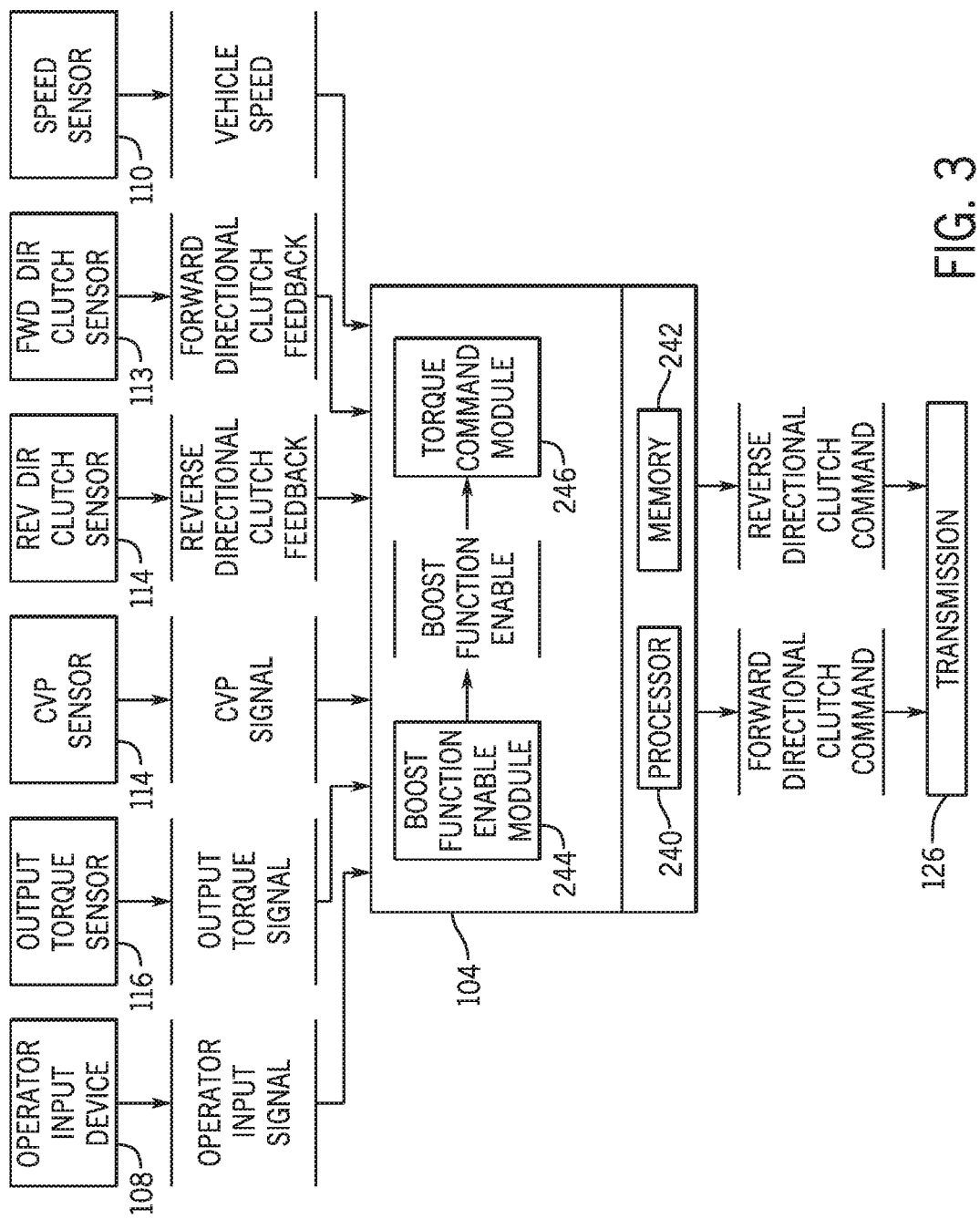
FIG. 3 is a dataflow diagram of a controller of the power control system in accordance with an example embodiment.

Referring now also to FIG. 3, a dataflow diagram illustrates an embodiment of the controller 104 implementing operation of the transmission 126 of the power control system 102 with the transient boost function. Generally, the controller 104 may be considered a vehicle controller or a dedicated transmission controller. With respect to the power control system 102 of FIG. 3, the controller 104 may be organized as one or more functional units or modules 244, 246 (e.g., software, hardware, or combinations thereof). As can be appreciated, the modules 244, 246 shown in FIG. 3 may be combined and/or further partitioned to carry out similar functions to those described herein. As an example, each of the modules 244, 246 may be implemented with processing architecture such as a processor 240 and memory 242, as well as suitable communication interfaces. For example, the controller 104 may implement the modules 244, 246 with the processor 240 based on programs or instructions stored in memory 242.

As can be appreciated, the controller 104 shown in FIG. 3 may be configured to output one or more control signals in the form of clutch commands to the forward directional clutch 194 and the reverse directional clutch 196 (FIG. 2) of the transmission 126. In particular, the controller 104 includes a boost function enable module 244 and a clutch torque command module 246 that collectively function to generate clutch command signals to realize the transient boost function, as discussed below. In additional to the depicted modules 244, 246 and operation described below, the controller 104 may implement the typical functions of the transmission 126, e.g., shifting between speeds and transmission modes based on operating conditions and operator input.

In some examples, the consideration and implementation of the transient boost function by the controller 104 are continuous, e.g., constantly active. In other examples, the activation of the transient boost function may be selective, e.g., enabled or disabled based on input from the operator or other considerations. In any event, the transient boost function may be enabled and implemented as described below.

As noted above, the controller 104 may be organized according to the boost function enable module 244 and the clutch torque command module 246. During operation, the boost function enable module 244 may receive input from the transmission selection device 108, vehicle speed sensor 110, and any other suitable source. The boost function enable module 244 generally evaluates the inputs as operating conditions and determines when the operating conditions are suitable for implementation of the transient boost function. For example, operating conditions that suggest implementation of the transient boost function include operation of the vehicle 100 in the series mode. In particular, the transient boost function may be implemented during one or more predetermined portions of the series mode or during the duration of the series mode.

As such, the boost function enable module 244 may determine when the vehicle 100 is preparing to enter or exit the series mode (e.g., going from a split mode to a series mode, or from a series mode to a split mode). In some instances, the transitions between series and split modes may occur during a shuttle shift. As one example, the boost function enable module 244 may determine that a boost function is appropriate when the signal from the transmission selection device 108 indicates that a shuttle shift is imminent. As another example, the boost function enable module 244 may determine that a boost function is appropriate when the vehicle speed slows to a predetermined value. Upon determining that the operating conditions suggest that the transient boost function is appropriate, the boost function enable module 244 generates a boost enable signal for the clutch torque command module 246.

Upon receiving the boost enable signal, the clutch torque command module 246 operates to generate clutch commands to actuate one or more of command the directional clutches 194, 196 to at least partially engage. Initially, the clutch torque command module 246 determines the directional clutch 194, 196 with which to implement the boost function based on the characteristics of the current (or imminent) series mode. In particular, the clutch torque command module 246 generates the clutch command for the reverse directional clutch 196 in a reverse portion of the series mode and the clutch command for the forward directional clutch 194 in the forward portion of the series mode. The generated clutch command may have one or more defined parameters, including the target of the clutch command (e.g., the selected directional clutch 194, 196), the time of initiation of the clutch command, the duration of the clutch command, and the resultant clutch torque of the clutch command.

In one example, the directional clutch 194, 196 that is selected for implementation of the boost function is a function of the travel direction that is immediately before or after a split mode during series mode of the shuttle shift. For example, after a forward split mode, upon transition into a series mode, the forward directional clutch 194 is selected for implementation of the boost function; after a reverse split mode, upon transition into a series mode, the reverse directional clutch 196 is selected for implementation of the boost function; during a series mode, prior to transition into a forward split mode, the forward directional clutch 194 is selected for implementation of the boost function; and during a series mode, prior to transition into a reverse split mode, the reverse directional clutch 196 is selected for implementation.

The remaining clutch command parameters, such as the time of initiation of the clutch command, the duration of the clutch command, and the resultant clutch torque of the clutch command, may be based on a number of considerations. For example, the time of initiation of the clutch command may be automatically generated at predetermined times. In other words, the clutch torque command module 246 may generate the clutch command immediately upon entering the series mode, at a predetermined amount of time prior to terminating the series mode, or throughout the series mode. In other instances, the clutch command may be a function of the operating conditions. For example, initiation of the clutch command may be based on the measured torque from the second CVP 122 and the desired torque from the second CVP 122, e.g., identifying a point in time in which the measured torque from the second CVP 122 is insufficient relative to the desired torque from the second CVP 122. In another example, the time of initiation may be a function of the measured output torque in view of the desired output torque, e.g., identifying a point in time in which the measured output torque is insufficient relative to the desired output torque. In further examples, the time of initiation may be based on vehicle speed, e.g., in which the boost function is initiated at a selected vehicle speed, typically a relatively slow vehicle speed. Such identification of times to initiate the boost function may occur in real time.

In some embodiments, the clutch torque command module 246 may generate the boost function clutch command for a selected directional clutch 194, 196 for a predetermined duration, e.g., 0.5 seconds, 1 second, 2 seconds, and so on. In other examples, the duration of the clutch command for the boost function may be based on the same parameters that initiated the boost function, including the measured torque from the second CVP 122 and the measured output torque. In effect, the inputs to the controller 104 may function as feedback such that the clutch command for the boost function continues as long as the conditions that initiated the boost function are still applicable.

The clutch command may be expressed as a "resultant torque quantity" or "resultant clutch torque" that represents a percentage value of torque passed across the respective clutch relative to fully engaged in which 100% of the torque is transferred across the engaged elements of the respective clutch to downstream transmission components. For example, a resultant clutch torque of 25% indicates a clutch command that partially engages the respective clutch such that approximately 25% of the potential torque is transferred between clutch elements.

In some embodiments, the resultant clutch torque during the transient boost function may be a predetermined value, e.g., 10%, 25%, 50%, or any suitable partial engagement. Generally, the resultant clutch torque is less than 25% or less than 50%. In further embodiments, the resultant clutch torque of the clutch command may be based on one or more input conditions, including the quantity of the difference between the measured torque from the second CVP 122 (or the measured output torque) and the desired torque from the second CVP 122 (or the desired output torque). For example, when such a quantity is relatively large, the resultant clutch torque of the clutch command is also relatively large, and vice versa. In some examples, the resultant clutch torque may be determined by accessing a look-up table of the differences between the measured second CVP torque (or the measured output torque) and the desired second CVP torque (or the desired output torque). The resultant clutch torque may be a single value or modified in real time based on additional input conditions.

Figure 4:
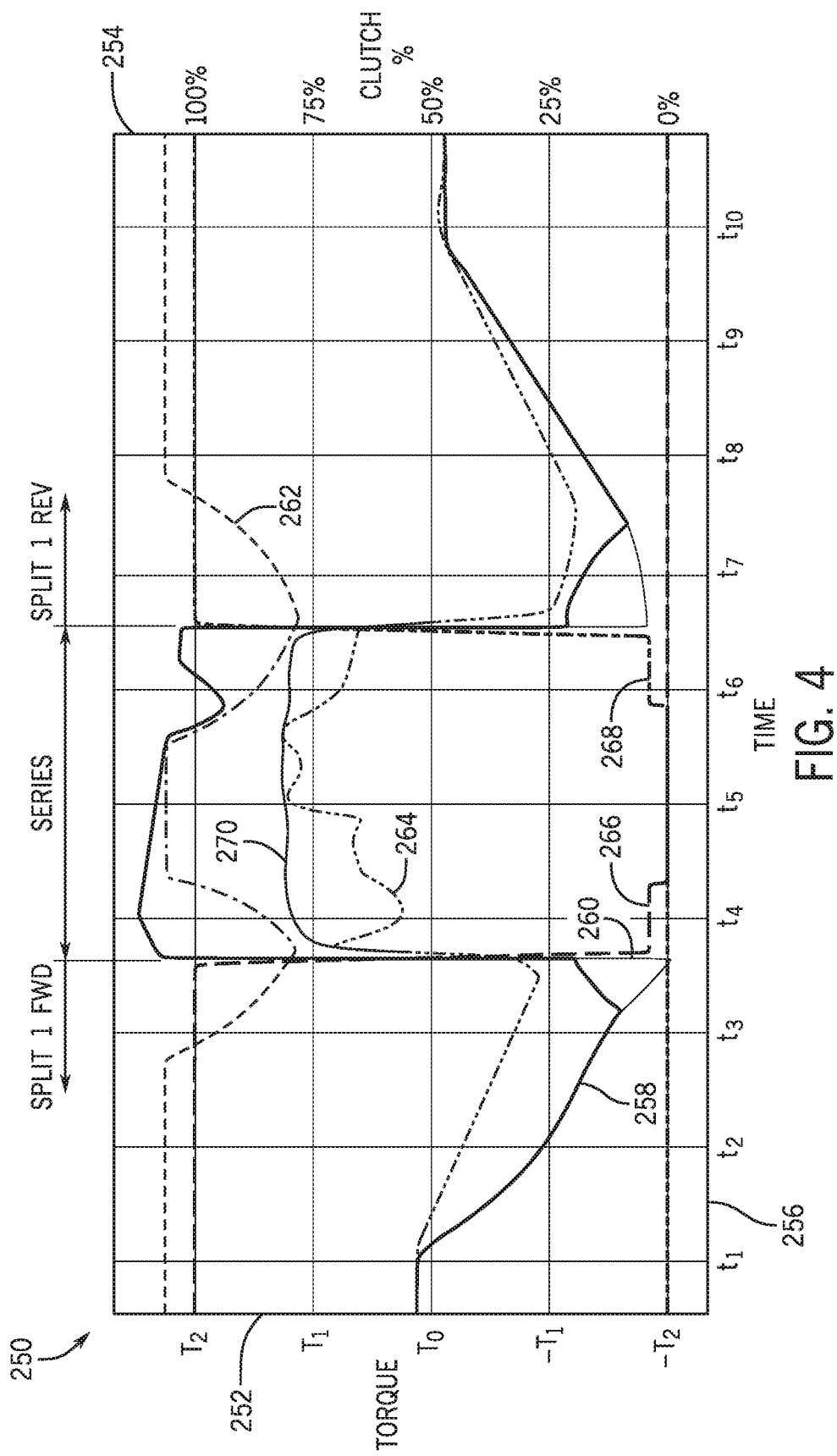
FIGS. 4-6 are data representations of various parameters during operation of the transmission transient boost function in accordance with an example embodiment.

Reference is now made to FIG. 4, which is a data representation 250 of operation depicting operation of the transmission 126 by the controller 104, including implementation of the transient boost function. The data representation 250 of FIG. 4 depicts various types of torque, indicated on the first (or left) vertical axis 252, as a function of time, indicated on the horizontal axis 256. The data representation 250 of FIG. 4 further depicts resultant clutch torque, indicated on the second (or right) vertical axis 254, as a function of time on the horizontal axis 256.

The data representation 250 includes a first line 258 depicting the measured second CVP torque over time; a second line 260 depicting the desired second CVP torque over time; a third line 262 depicting maximum second CVP torque over time; a fourth line 264 depicting measured nominal output torque over time; a fourth line 266 depicting resultant clutch torque on first directional clutch over time during a transient boost function; a fifth line 268 depicting resultant clutch torque on second directional clutch over time during a transient boost function; and a sixth line 270 depicting boost function output torque over time.

Generally, with respect to time, the data representation 250 of FIG. 4 corresponds to a scenario in which the vehicle 100 is performing a shuttle shift from a forward direction to a reverse direction. In particular, as shown, the vehicle 100 operates in a forward split mode from about time position $t_0$ to about time position $t_{3.75}$; transitions into a series mode at about time position $t_{3.75}$; operates in the series mode from about time position $t_{3.75}$ to about time position $t_{6.5}$; transitions into the reverse split mode at about time position $t_{6.5}$; and operates in the reserve split mode beyond about time position $t_{6.5}$.

With respect to the first line 258 of FIG. 4, the second CVP torque reflects the torque from the second CVP 122 that is transferred into the transmission 126, e.g., as determined based on data from the CVP sensor 114 (FIG. 2). As shown, the measured second CVP torque (line 258) diverges from the desired second CVP torque (line 260), particularly in areas immediately before and after the transitions between modes. This is typically a result of dips in the maximum CVP torque (line 262) associated with the physical limitations of the second CVP 122. During the nominal function (e.g., without the boost function), these conditions result in an output torque that dips at the beginning and end portions of the series mode, as reflected by line 264. However, as noted above, these conditions (as well as others), may result in the implementation of the boost function.

As reflected by line 266, the forward directional clutch 194 is in a fully engaged state (e.g., a resultant clutch torque of approximately 100%) during the forward split mode, and subsequently, the forward directional clutch 194 is commanded into a partially engaged state of approximately 5% to implement a transient boost function. In particular, the partially engaged state of the forward directional clutch 194 during the boost function is initiated upon the initiation of the series mode at approximately time position $t_{3.75}$ and has a duration during the initial portions of the series mode of from about time position $t_{3.75}$ to about time position $t_{4.25}$ at which time the boost function is terminated and the forward directional clutch 194 is fully disengaged (e.g., a resultant clutch torque of 0%).

As reflected by line 268, the reverse directional clutch 196 is in a fully disengaged state (e.g., a resultant clutch torque of approximately 0%) during the forward split mode and an initial portion of the series mode, at which time the controller 104 (FIG. 3) evaluates the operating conditions to initiate a further instance of the transient boost function. In particular, at approximately time position $t_{5.8}$, which corresponds to a short duration prior to the termination of the series mode, the boost function is initiated and the reverse directional clutch 196 partially engages (e.g., a resultant clutch torque of approximately 5%) to implement the transient boost function. At the termination of the series mode and transition into the reverse split mode, the transient boost function terminates and the reverse directional clutch 196 is commanded into the fully engaged state (e.g., a resultant clutch torque of 100%) to continue operation in the reverse split mode.

In effect, the series mode has a forward series mode portion, prior to the vehicle and/or engine speed going to zero (e.g., the vehicle creeping in the forward direction), and a reverse series mode portion, after the vehicle and/or engine speed going to zero (e.g., the vehicle creeping in the reverse direction). The forward directional clutch 194 is partially engaged during at least a portion of the forward series mode portion, and the reverse directional clutch 196 is partially engaged during at least a portion of the reverse series mode portion.

As reflected by a comparison between line 264 and line 270, the two instances of implementation of the boost function results in an output torque (line 270) without the dips resulting from reduced capability of the second CVP 122 (line 262), as compared to the nominal function output torque (line 264). In effect, the partially engaged directional clutches 194, 196 operate to supplement the reduced torque from the second CVP 122 such that the overall output torque may be maintained.

Figure 5:
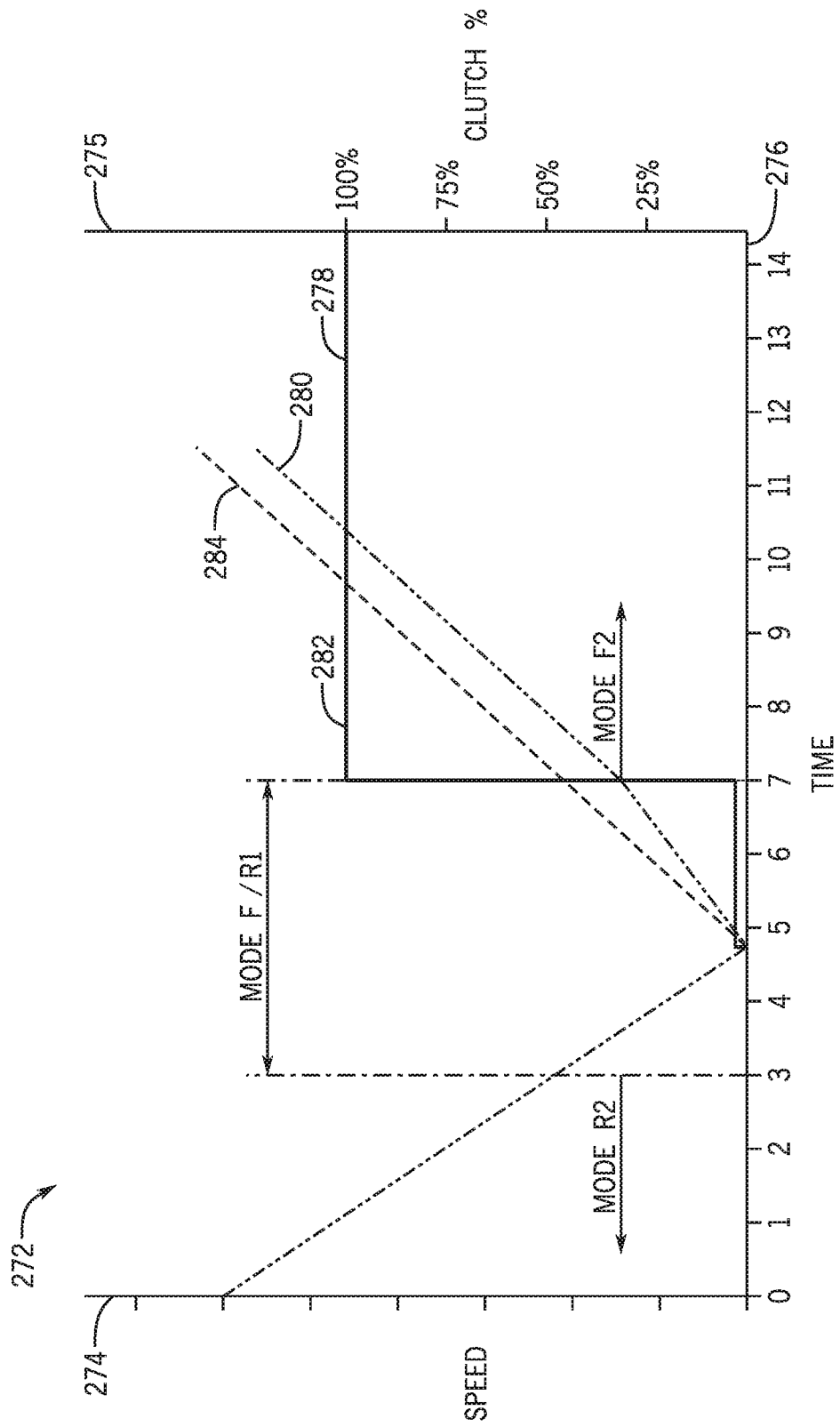
Figure 6:
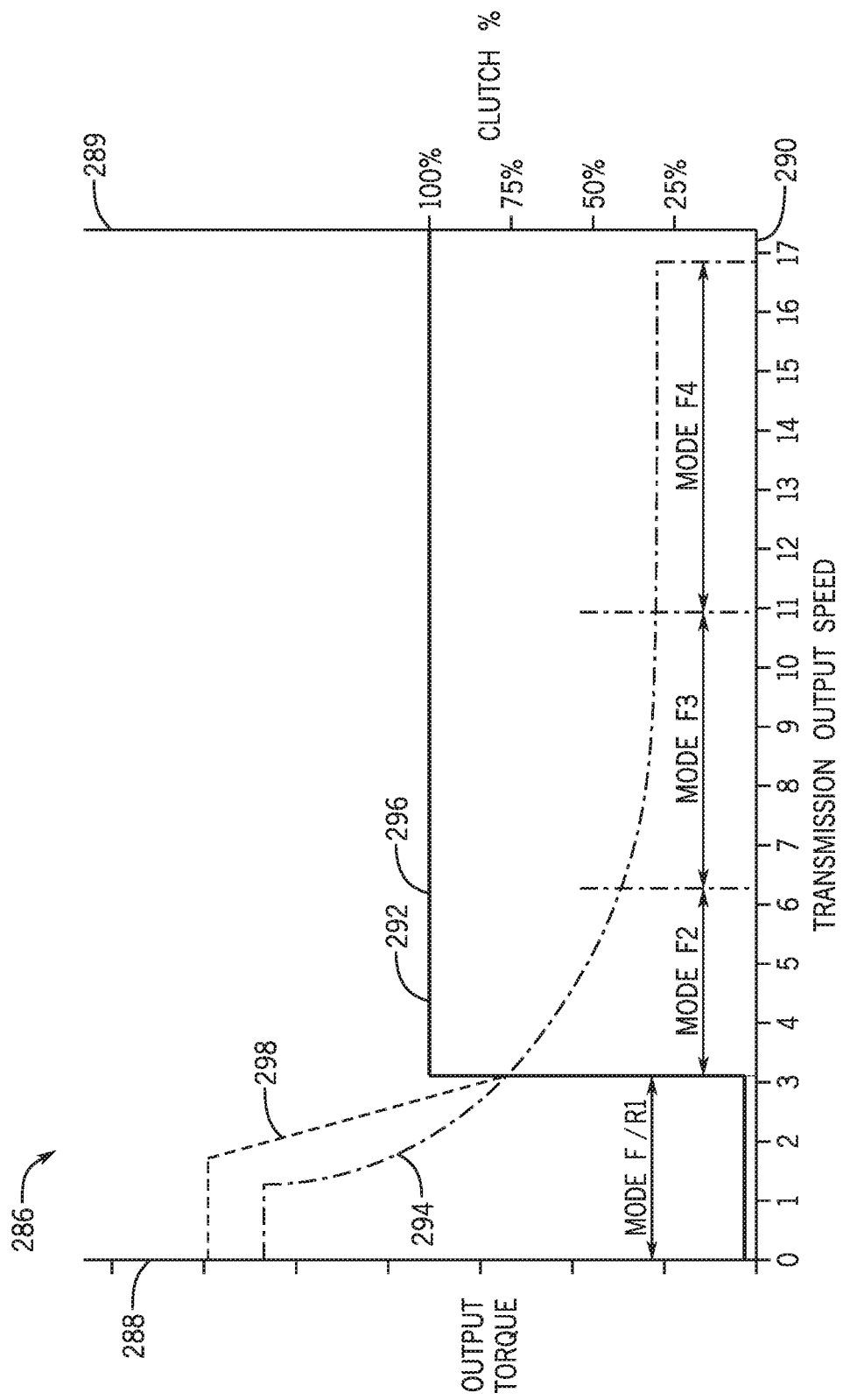

The views of FIGS. 5 and 6 provide further data representations 272, 286 depicting operation of the transmission 126 by the controller 104. Particularly referring to FIG. 5, the data representation 272 generally depicts operation of the transmission 126 over time (indicated by the horizontal axis 276) during a shuttle shift in which the transmission 126 transitions between from the reverse split mode (e.g. from 0 seconds to 3 seconds), through a split mode (e.g., from about 3 seconds to about 7 seconds), and to a forward split mode (e.g., beyond 7 seconds). In FIG. 5, transmission output speed is indicated on a first (or left) vertical axis 274 and resultant clutch torque is indicated on a second (or right) vertical axis 275. The data representation 272 includes the resultant clutch torque of the forward directional clutch 194 (represented by line 278) depicting the shuttle shift implementing a nominal function (e.g., without a transient boost function) and the resulting transmission output speed (represented by line 280). As shown by lines 278, 280, the resultant clutch torque of the forward directional clutch 194 is 0% during the reverse split mode and the series mode and is actuated to 100% during the forward split mode.

The data representation 272 further includes the resultant clutch torque of the forward directional clutch 194 (represented by line 284) depicting the shuttle shift implementing the transient boost function and the resulting transmission output speed (represented by line 282). As shown by lines 282, 284, the resultant clutch torque of the forward directional clutch 194 is 0% during the reverse split mode and an initial portion the series mode. As the output speed decreases to 0 during the series mode, the forward directional clutch 194 is partially engaged to about 20% and subsequently increased to 100% upon transitioning into the forward split mode. As clear from a comparison of line 280 and line 284, the transient boost function operates to increase the transmission output speed relative to operation according to the nominal function.

Now referring to FIG. 6, the data representation 286 generally depicts operation of the transmission 126 over increasing transmission output speed (indicated by the horizontal axis 290) during a transition of the transmission 126 from a series mode (e.g. from 0 seconds to 2 seconds) into a number of forward split modes (e.g., beyond 2 seconds). In FIG. 6, transmission output torque is indicated on a first (or left) vertical axis 288 and resultant clutch torque is indicated on a second (or right) vertical axis 289. The data representation 286 includes the resultant clutch torque of the forward directional clutch 194 (represented by line 292) implementing a nominal function (e.g., without a transient boost function) and the resulting transmission output torque (represented by line 294). As shown by lines 292, 294, the resultant clutch torque of the forward directional clutch 194 is 0% during the series mode and is actuated to 100% during the forward split modes. The data representation 286 further includes the resultant clutch torque of the forward directional clutch 194 (represented by line 296) depicting implementation of the transient boost function and the resulting transmission output torque (represented by line 298). As shown by lines 296, 298, the resultant clutch torque of the forward directional clutch 194 is approximately 10% during the duration of the series mode and is subsequently increased to 100% upon transitioning into the forward split modes. As is clear from a comparison of line 294 and line 298, the transient boost function operates to increase the transmission output torque relative to operation according to the nominal function.

Accordingly, the present power control system provides a transmission with a number of clutches to implement the various modes. Generally, the clutches, upon actuation, are fully engaged to implement the modes. However, as described herein, the power control system may implement a transient boost function during the series mode in which one or more clutches are partially engaged such that power from the engine may be used to supplement the power from the motors. By using the power control system of the present disclosure, the transient boost function provides more consistent power, typically without requiring a larger motor to otherwise provide the commanded power, thereby improving packaging and cost.

Also, the following examples are provided, which are numbered for easier reference.

1. A control system for operating a power train of a work vehicle having an engine and at least one motor configured to generate power for an output shaft, the control system comprising: a transmission positioned operatively between the engine, the at least one motor, and the output shaft, the transmission comprising at least one directional clutch and a plurality of control assembly clutches coupled together and configured for selective engagement to transfer the power from the engine and the at least one motor to drive the output shaft according to a plurality of modes; and a controller, having a processor and memory architecture, configured to selectively actuate the at least one directional clutch and the plurality of control assembly clutches with clutch commands to implement the plurality of modes, including a first split mode in which the at least one directional clutch is fully engaged and at least one of the plurality of the control assembly clutches is fully engaged to transfer combined power from the engine and the at least one motor to drive the output shaft, a first direct drive mode in which the at least one directional clutch is fully engaged and at least one of the plurality of the control assembly clutches is fully engaged to transfer power from only the engine to drive the output shaft, and a first series mode in which at least one of the plurality of the control assembly clutches is fully engaged to transfer power from primarily the at least one motor to drive the output shaft, the controller further configured to implement a transient boost function within at least a portion of the first series mode in which the at least one directional clutch is partially engaged to supplement power from the at least one motor with power from the engine to drive the output shaft.

2. The control system of example 1, wherein the controller is configured to implement the transient boost function immediately at an initiation of the first series mode for a partial duration of the first series mode.

3. The control system of example 2, wherein the controller is configured to terminate the transient boost function after the partial duration of the first series mode at which time the at least one directional clutch is fully disengaged.

4. The control system of example 1, wherein the controller is configured to implement the transient boost function at a time after an initiation of the first series mode and prior to an end of the first series mode at a duration that extends to the end of the first series mode.

5. The control system of example 1, wherein the controller is configured to implement the transient boost function at an initiation of the first series mode in which the at least one directional clutch is partially engaged, to terminate the transient boost function during an intermediate portion of the first series mode in which the at least one directional clutch is fully disengaged, and to implement the transient boost function at an end of the first series mode.

6. The control system of example 1, wherein the controller is configured to implement the transient boost function throughout the first series mode.

7. The control system of example 1, wherein, during implementation of the transient boost function, the controller generates the clutch commands such that a resultant clutch torque at the at least one directional clutch is less than 10%.

8. The control system of example 1, wherein, during implementation of the transient boost function, the controller generates the clutch commands such that a resultant clutch torque at the at least one directional clutch is less than 5%.

9. The control system of example 1, wherein, during implementation of the transient boost function, the controller generates the clutch commands for partial engagement of the at least one directional clutch for a duration of less than 1 second.

10. The control system of example 1, wherein the at least one directional clutch includes a forward directional clutch, the first split mode is a forward split mode in which the forward directional clutch is fully engaged and the at least one of the plurality of the control assembly clutches is fully engaged to transfer the combined power from the engine and the at least one motor to drive the output shaft in a forward direction, the first direct drive mode is a forward direct drive mode in which the forward directional clutch is fully engaged and the at least one of the plurality of the control assembly clutches is fully engaged to transfer power from only the engine to drive the output shaft in the forward direction, and the first series mode includes a forward series mode portion in which the at least one of the plurality of the control assembly clutches is fully engaged to transfer power from primarily the at least one motor to drive the output shaft in the forward direction, and wherein the controller, during the transient boost function within the forward series mode portion, is configured to generate the clutch commands to partially engage the forward directional clutch.

11. The control system of example 10, wherein the at least one directional clutch further includes a reverse directional clutch, wherein the plurality of modes implemented by controller includes a reverse split mode in which the reverse directional clutch is fully engaged and the at least one of the plurality of the control assembly clutches is fully engaged to transfer the combined power from the engine and the at least one motor to drive the output shaft in a reverse direction, and a reverse direct drive mode in which the reverse directional clutch is fully engaged and the at least one of the plurality of the control assembly clutches is fully engaged to transfer power from only the engine to drive the output shaft in the reverse direction, and wherein the first series mode includes a reverse series mode portion in which the at least one of the plurality of the control assembly clutches is fully engaged to transfer power from primarily the at least one motor to drive the output shaft in the reverse direction, and wherein the controller, during the transient boost function within the reverse series mode portion, is configured to generate the clutch commands to partially engage the reverse directional clutch.

12. The control system of example 11, wherein the controller is configured to implement a shuttle shift in which the transmission transitions from the forward split mode, into the first series mode, and into the reverse split mode, and wherein the controller is configured to implement the transient boost function during the forward series mode portion of the first series mode immediately after the forward split mode, and during the reverse series mode portion of the first series mode immediately before the reverse split mode.

13. The control system of example 11, wherein the controller is configured to implement a shuttle shift in which the transmission transitions from the reverse split mode, into the first series mode, and into the forward split mode, and wherein the controller is configured to implement the transient boost function during the reverse series mode portion of the first series mode immediately after the reverse split mode, and during the forward series mode portion of the first series mode immediately before the forward split mode.

14. A work vehicle comprising: an engine; at least one continuously variable power source (CVP); an output shaft; a transmission positioned operatively between the engine, the at least one motor, and the output shaft, the transmission comprising at least one directional clutch and a plurality of control assembly clutches coupled together and configured for selective engagement to transfer the power from the engine and the at least one motor to drive the output shaft according to a plurality of modes; and a controller, having a processor and memory architecture, configured to selectively actuate the at least one directional clutch and the plurality of control assembly clutches with clutch commands to implement the plurality of modes, including a first split mode in which the at least one directional clutch is fully engaged and at least one of the plurality of the control assembly clutches is fully engaged to transfer combined power from the engine and the at least one motor to drive the output shaft, a first direct drive mode in which the at least one directional clutch is fully engaged and at least one of the plurality of the control assembly clutches is fully engaged to transfer power from only the engine to drive the output shaft, and a first series mode in which at least one of the plurality of the control assembly clutches is fully engaged to transfer power from primarily the at least one motor to drive the output shaft, the controller further configured to implement a transient boost function within at least a portion of the first series mode in which the at least one directional clutch is partially engaged to supplement power from the at least one motor with power from the engine to drive the output shaft.

15. The work vehicle of example 14, wherein the controller is configured to implement the transient boost function immediately at an initiation of the first series mode for a partial duration of the first series mode.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A control system for operating a power train of a work vehicle having an engine and at least one motor configured to generate power for an output shaft, the control system comprising:
   a transmission positioned operatively between the engine, the at least one motor, and the output shaft, the transmission comprising at least one directional clutch and a plurality of control assembly clutches coupled together and configured for selective engagement to transfer the power from the engine and the at least one motor to drive the output shaft according to a plurality of modes; and
   a controller, having a processor and memory architecture, configured to selectively actuate the at least one directional clutch and the plurality of control assembly clutches with clutch commands to implement the plurality of modes, including a first split mode in which the at least one directional clutch is fully engaged and at least one of the plurality of the control assembly clutches is fully engaged to transfer combined power from the engine and the at least one motor to drive the output shaft, a first direct drive mode in which the at least one directional clutch is fully engaged and at least one of the plurality of the control assembly clutches is fully engaged to transfer power from only the engine to drive the output shaft, and a first series mode in which at least one of the plurality of the control assembly clutches is fully engaged to transfer power from primarily the at least one motor to drive the output shaft, the controller further configured to implement a transient boost function within at least a portion of the first series mode in which the at least one directional clutch is partially engaged to supplement power from the at least one motor with power from the engine to drive the output shaft.

2. The control system of claim 1, wherein the controller is configured to implement the transient boost function immediately at an initiation of the first series mode for a partial duration of the first series mode.

3. The control system of claim 2, wherein the controller is configured to terminate the transient boost function after the partial duration of the first series mode at which time the at least one directional clutch is fully disengaged.

4. The control system of claim 1, wherein the controller is configured to implement the transient boost function at a time after an initiation of the first series mode and prior to an end of the first series mode at a duration that extends to the end of the first series mode.

5. The control system of claim 1, wherein the controller is configured to implement the transient boost function at an initiation of the first series mode in which the at least one directional clutch is partially engaged, to terminate the transient boost function during an intermediate portion of the first series mode in which the at least one directional clutch is fully disengaged, and to implement the transient boost function at an end of the first series mode.

6. The control system of claim 1, wherein the controller is configured to implement the transient boost function throughout the first series mode.

7. The control system of claim 1, wherein, during implementation of the transient boost function, the controller generates the clutch commands such that a resultant clutch torque at the at least one directional clutch is less than 10%.

8. The control system of claim 1, wherein, during implementation of the transient boost function, the controller generates the clutch commands such that a resultant clutch torque at the at least one directional clutch is less than 5%.

9. The control system of claim 1, wherein, during implementation of the transient boost function, the controller generates the clutch commands for partial engagement of the at least one directional clutch for a duration of less than 1 second.

10. The control system of claim 1,
wherein the at least one directional clutch includes a forward directional clutch, the first split mode is a forward split mode in which the forward directional clutch is fully engaged and the at least one of the plurality of the control assembly clutches is fully engaged to transfer the combined power from the engine and the at least one motor to drive the output shaft in a forward direction, the first direct drive mode is a forward direct drive mode in which the forward directional clutch is fully engaged and the at least one of the plurality of the control assembly clutches is fully engaged to transfer power from only the engine to drive the output shaft in the forward direction, and the first series mode includes a forward series mode portion in which the at least one of the plurality of the control assembly clutches is fully engaged to transfer power from primarily the at least one motor to drive the output shaft in the forward direction, and wherein the controller, during the transient boost function within the forward series mode portion, is configured to generate the clutch commands to partially engage the forward directional clutch.

11. The control system of claim 10,
wherein the at least one directional clutch further includes a reverse directional clutch,
wherein the plurality of modes implemented by controller includes a reverse split mode in which the reverse directional clutch is fully engaged and the at least one of the plurality of the control assembly clutches is fully engaged to transfer the combined power from the engine and the at least one motor to drive the output shaft in a reverse direction, and a reverse direct drive mode in which the reverse directional clutch is fully engaged and the at least one of the plurality of the control assembly clutches is fully engaged to transfer power from only the engine to drive the output shaft in the reverse direction, and wherein the first series mode includes a reverse series mode portion in which the at least one of the plurality of the control assembly clutches is fully engaged to transfer power from primarily the at least one motor to drive the output shaft in the reverse direction, and wherein the controller, during the transient boost function within the reverse series mode portion, is configured to generate the clutch commands to partially engage the reverse directional clutch.

12. The control system of claim 11,
wherein the controller is configured to implement a shuttle shift in which the transmission transitions from the forward split mode, into the first series mode, and into the reverse split mode, and wherein the controller is configured to implement the transient boost function during the forward series mode portion of the first series mode immediately after the forward split mode, and during the reverse series mode portion of the first series mode immediately before the reverse split mode.

13. The control system of claim 11,
wherein the controller is configured to implement a shuttle shift in which the transmission transitions from the reverse split mode, into the first series mode, and into the forward split mode, and wherein the controller is configured to implement the transient boost function during the reverse series mode portion of the first series mode immediately after the reverse split mode, and during the forward series mode portion of the first series mode immediately before the forward split mode.

14. A work vehicle comprising:
an engine;
at least one continuously variable power source (CVP);
an output shaft;

a transmission positioned operatively between the engine, the at least one motor, and the output shaft, the transmission comprising at least one directional clutch and a plurality of control assembly clutches coupled together and configured for selective engagement to transfer the power from the engine and the at least one motor to drive the output shaft according to a plurality of modes; and a controller, having a processor and memory architecture, configured to selectively actuate the at least one directional clutch and the plurality of control assembly clutches with clutch commands to implement the plurality of modes, including a first split mode in which the at least one directional clutch is fully engaged and at least one of the plurality of the control assembly clutches is fully engaged to transfer combined power from the engine and the at least one motor to drive the output shaft, a first direct drive mode in which the at least one directional clutch is fully engaged and at least one of the plurality of the control assembly clutches is fully engaged to transfer power from only the engine to drive the output shaft, and a first series mode in which at least one of the plurality of the control assembly clutches is fully engaged to transfer power from primarily the at least one motor to drive the output shaft, the controller further configured to implement a transient boost function within at least a portion of the first series mode in which the at least one directional clutch is partially engaged to supplement power from the at least one motor with power from the engine to drive the output shaft.

15. The work vehicle of claim 14, wherein the controller is configured to implement the transient boost function immediately at an initiation of the first series mode for a partial duration of the first series mode.

16. The work vehicle of claim 14, wherein the controller is configured to implement the transient boost function at a time after an initiation of the first series mode and prior to an end of the first series mode at a duration that extends to the end of the first series mode.

17. The work vehicle of claim 14, wherein the controller is configured to implement the transient boost function at an initiation of the first series mode in which the at least one directional clutch is partially engaged, to terminate the transient boost function during an intermediate portion of the first series mode in which the at least one directional clutch is fully disengaged, and to implement the transient boost function at an end of the first series mode.

18. The work vehicle of claim 14, wherein the controller is configured to implement the transient boost function throughout the first series mode.

19. The work vehicle of claim 14, wherein, during implementation of the transient boost function, the controller generates the clutch commands such that a resultant clutch torque at the at least one directional clutch is less than 5%.

20. The work vehicle of claim 14, wherein, during implementation of the transient boost function, the controller generates the clutch commands for partial engagement of the at least one directional clutch for a duration of less than 1 second.

* * * * *